US008160550B2

(12) United States Patent
Oh

(10) Patent No.: US 8,160,550 B2
(45) Date of Patent: Apr. 17, 2012

(54) METHOD FOR DOWNLOADING A MESSAGE IN A MOBILE TERMINAL, METHOD FOR FORWARDING MESSAGE, AND MOBILE TERMINAL FOR PERFORMING THE SAME

(75) Inventor: Jung Kyun Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 1236 days.

(21) Appl. No.: 11/864,752

(22) Filed: Sep. 28, 2007

(65) Prior Publication Data

US 2008/0081595 A1   Apr. 3, 2008

(30) Foreign Application Priority Data

Oct. 2, 2006   (KR) ........................ 10-2006-0097242

(51) Int. Cl.
  *H04M 1/725*   (2006.01)
  *G06F 15/16*   (2006.01)
  *G06F 15/173*   (2006.01)
(52) U.S. Cl. ...................... 455/412.2; 709/206; 709/207; 709/232; 709/246; 709/230; 358/1.15; 358/403; 358/440; 358/442; 358/443
(58) Field of Classification Search ........................ None
See application file for complete search history.

(56) References Cited

U.S. PATENT DOCUMENTS

| 6,457,044 | B1* | 9/2002 | IwaZaki ........................ 709/206 |
| 6,501,472 | B1* | 12/2002 | Hunt et al. .................... 345/428 |
| 6,742,043 | B1* | 5/2004 | Moussa et al. ................ 709/232 |
| 6,950,101 | B2* | 9/2005 | Hunt et al. .................... 345/428 |
| 6,952,279 | B1* | 10/2005 | Iida .............................. 358/1.15 |
| 7,391,526 | B2* | 6/2008 | Nishimura ................... 358/1.15 |
| 7,487,155 | B2* | 2/2009 | Jebens et al. .......................... 1/1 |
| 7,818,764 | B2* | 10/2010 | Matz ............................... 725/34 |
| 2005/0132015 | A1* | 6/2005 | Swinton ........................ 709/207 |
| 2005/0193069 | A1* | 9/2005 | Brown et al. ................. 709/206 |
| 2006/0167940 | A1* | 7/2006 | Colton et al. .............. 707/104.1 |
| 2007/0016636 | A1* | 1/2007 | Boerries et al. ............... 709/200 |

FOREIGN PATENT DOCUMENTS

KR   1020060002288   1/2006

* cited by examiner

*Primary Examiner* — Patrick Edouard
*Assistant Examiner* — Scott Schlack
(74) *Attorney, Agent, or Firm* — Lee, Hong, Degerman, Kang & Waimey

(57) ABSTRACT

A mobile terminal and a method for downloading a message in a mobile terminal, the method includes receiving a notification message comprising information indicating whether a media file included in a transmitted message is modified, and selectively requesting downloading of the transmitted message to the mobile terminal, if the media file is modified, based upon a message reception mode of the mobile terminal.

8 Claims, 7 Drawing Sheets

METHOD FOR DOWNLOADING A MESSAGE IN A MOBILE TERMINAL, METHOD FOR FORWARDING MESSAGE, AND MOBILE TERMINAL FOR PERFORMING THE SAME

CROSS-REFERENCE TO RELATED APPLICATIONS

Pursuant to 35 U.S.C. §119(a), this application claims the benefit of earlier filing date and right of priority to Korean Patent Application No. 10-2006-0097242, filed on Oct. 2, 2006, the contents of which are hereby incorporated by reference herein in its entirety.

FIELD OF INVENTION

The present invention generally relates to wireless communication, and in particular, a method for downloading a message in a mobile terminal, a method for forwarding a message, and a mobile terminal for performing the same.

DESCRIPTION OF RELATED ART

A multimedia messaging service is a service that sends a message comprising various media such as a picture, a moving image, a character, and music in the mobile terminal.

If a user of a transmitting mobile terminal using the multimedia message service writes and transmits a multimedia message, the transmitted multimedia message arrives in a Multimedia Message Service Center (MMSC).

The MMSC checks information of media that can be supported in a receiving mobile terminal using a User Agent (UA) profile of the receiving mobile terminal. The MMSC modifies and converts an attached file included in the multimedia message received from the transmitting mobile terminal to a format that can be supported in the receiving mobile terminal, and then transmits the attached file to the receiving mobile terminal.

However, a user of the receiving mobile terminal could not check whether the attached file included in the received multimedia message was modified. Further, when the receiving mobile terminal received a multimedia message including the modified attached file and forwarded the message to another user, there was no method of forwarding the originally received message, without modifications.

SUMMARY OF THE INVENTION

In one general aspect of the present invention, a method for obtaining messages in a mobile terminal is provided, the method includes receiving a notification message including information indicating whether a media file included in a transmitted message is modified, and selectively requesting downloading of the transmitted message to the mobile terminal, if the media file is modified, based upon a message reception mode of the mobile terminal.

It is contemplated that the message reception mode includes either a first mode or a second mode, and wherein the first mode indicates that the downloading of the transmitted message is to be requested, and wherein the second mode indicates that the downloading of the transmitted message is not to be requested. It is further contemplated that method includes checking if the message reception mode is either the first mode or the second mode.

It is contemplated that when the second mode is set the message comprising the modified media file is rejected. It is further contemplated that the method includes storing the modified media file included in the downloaded message in memory.

It is contemplated that the notification message is a 'M-notification.ind' message and the information indicating whether the media file is modified is included in a specific field of the notification message. It is further contemplated that the method includes transmitting a response message including a request to delete or store the modified media file to a network entity.

It is also contemplated that when transmitting the response message requesting to store the modified media file, the response message includes information defining a storage period for the modified media file.

In another aspect of the present invention, a method for forwarding a message by a mobile terminal is provided, the method includes receiving a user request to forward a message to another user, determining if the message includes a media file which has been modified from an original media file, displaying information on a display indicating that the media file has been modified, if the media file has been modified, and receiving a user selection which indicates that either the modified media file or the original media file is to be forwarded to the user, transmitting, based upon the user selection, a request from the mobile terminal requesting a network entity forward with the message with either the modified media file or the original media file with the message.

It is contemplated that the information indicating whether the message includes a modified media file is determined by parsing a synchronized markup integration language (SMIL) file included in the message.

In another aspect of the present invention, a mobile terminal includes a transceiver for receiving a notification message including information indicating whether a media file in a transmitted message is modified, and a controller for requesting downloading of the transmitted message and receiving a downloaded message, if the media file is modified, based upon a message reception mode of the mobile terminal.

It is contemplated that the mobile terminal includes a memory for storing the message reception mode including information indicating whether the mobile terminal receives a message comprising a modified media file, wherein when the message reception mode is not set to receive the message comprising the modified media file, the controller does not requests downloading the message.

It is further contemplated that mobile terminal includes a display for displaying the modified media file on the display, and an audio processor for executing the modified media file.

It is also contemplated that the controller generates a response message requesting to delete or store the modified media file, and controls the transmission of the response message.

It is further contemplated that the mobile terminal includes an input device for requesting to forward a message in the mobile terminal, wherein the controller checks whether the message to be forwarded includes the modified media file, and displays information indicating that the message is different from an original message when the message includes the modified media file.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed. These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The aspects and features of the present invention and methods for achieving the aspects and features will be apparent by referring to the embodiments to be described in detail with reference to the accompanying drawings. However, the present invention is not limited to the embodiments disclosed hereinafter but can be implemented in diverse forms. The matters defined in the description, such as the detailed construction and elements, are nothing but specific details provided to assist those of ordinary skill in the art in a comprehensive understanding of the invention. The present invention is only defined within the scope of the appended claims. In the entire description of the present invention, the same drawing reference numerals are used for the same elements across various figures.

The embodiments of the present invention will be described in detail with reference to the accompanying drawings.

DETAILED DESCRIPTION OF THE INVENTION

Figure 1:
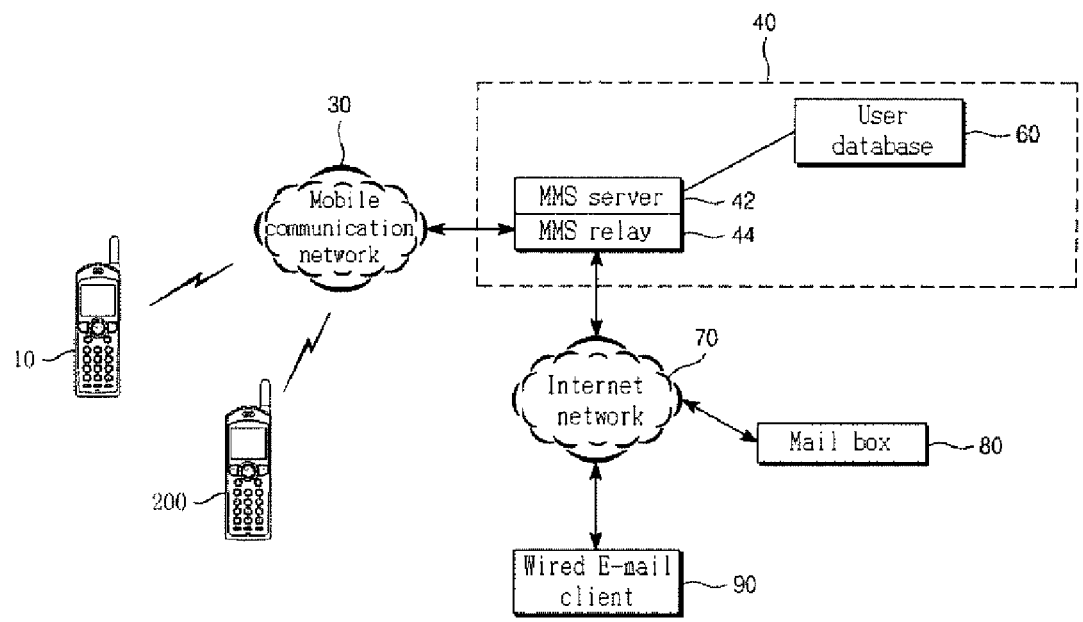
FIG. 1 is a block diagram of a multimedia messaging service system according to an embodiment of the present invention.

A method for downloading a message of a mobile terminal, a method for forwarding a message, and a mobile terminal for performing the same will now be described in detail with reference to the accompanying drawings. In the accompanying drawings, the same reference numerals are used to denote the same functional elements throughout the accompanying drawings.

FIG. 1 is a block diagram of a multimedia messaging service system according to an embodiment of the present invention.

Referring to FIG. 1, the multimedia messaging service system includes a transmitting mobile terminal 10, a receiving mobile terminal 200, and a mobile communication network 30 for connecting the transmitting mobile terminal 10 and the receiving mobile terminal 200 to a MMSC 40 such that the transmitting mobile terminal 10 and the receiving mobile terminal 200 may communicate with the MMSC 40.

The mobile communication network 30 may include a Global System for Mobile communication (GSM) network, a Universal Mobile Telecommunications System (UMTS) network, a General Packet Radio Service (GPRS) network, or a wireless local area network.

The Multimedia Message Service (MMS) system includes an external server, such as a mail box 80, and an Internet network connected to a wired E-mail client 90. The mail box 80 is connected to the Internet network 70 to store a message in an E-mail system. The wired E-mail client 90 is connected to the Internet network 70 and sends an E-mail via wired connections.

The MMSC 40 includes a MMS server 42, a MMS relay 44, and a user database 60. The MMS server 42 processes and stores a MMS message to be transmitted and/or received. The MMS relay 44 transmits the message between different message systems. The user database 60 stores a User Agent (UA) profile information. The UA profile information includes application profile information of a mobile terminal joined in a multimedia messaging service.

Figure 2:
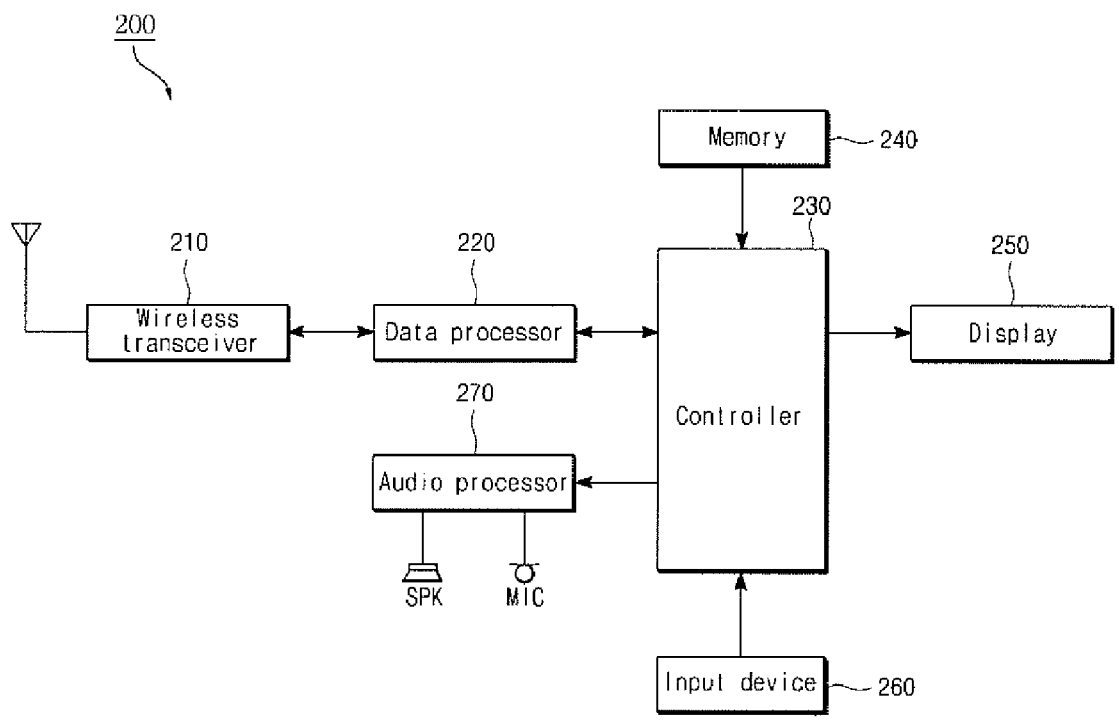
FIG. 2 is a block diagram of a mobile terminal of an embodiment of the present invention.

FIG. 2 is a block diagram of a mobile terminal according to an embodiment of the present invention. Referring to FIG. 2, the mobile terminal 200 includes a wireless transceiver 210, a data processor 220, a controller 230, a memory 240, a display 250, an input device 260, and an audio processor 270.

The wireless transceiver 210 performs a communication function of the mobile terminal 200. According to an embodiment of the present invention, the wireless transceiver 210 communicates with the MMSC 40.

The data processor 220 includes a transmitter for encoding and modulating the transmitted signal and a receiver for demodulating and decoding the received signal.

The controller 230 performs control functions associated with the mobile terminal 200. The controller 230 checks a notifying message received through the wireless transceiver 210 and checks whether a media file included in a multimedia message transmitted from the transmitting mobile terminal 10 is modified or converted.

The controller 230 checks a message reception mode of the mobile terminal 200 stored in the memory 240, and checks whether the mode is set to receive the modified or converted multimedia message or to reject reception of the modified/converted multimedia message.

Furthermore, the controller 230 checks a multimedia message received from the MMSC 40 through the wireless transceiver 210 and checks whether the modified/converted media file is included in the received multimedia message. When the modified/converted media file is included in the received multimedia message, the controller 230 stores the corresponding media file in the memory 240.

The memory 240 includes a program memory and a data memory. Programs for controlling general operation of the mobile terminal 200 are stored in the program memory.

In accordance with an embodiment of the present invention, the memory 240 stores a software program for performing a Short Message Service (SMS) and a Multimedia Messaging Service (MMS). The memory 240 stores a message reception mode of the mobile terminal 200. The message reception mode includes information regarding whether to receive or reject a message comprising the modified/converted multimedia file. Furthermore, the memory 240 separately stores the modified/converted multimedia file by the control of the controller 230.

The input device 260 includes various keys for inputting numeric and character information, and function keys for setting various functions. The input device 260 can be embodied with a keypad comprising a directional key, a jog dial, a touch screen, or a joy stick.

The input device 260 may be used to set a message reception mode of the mobile terminal 200. The input device 260 receives a request for downloading a message or a request for forwarding a message from a user and transmits the request to the controller 230.

When it is requested to forward a message, the input device 260 receives from the user the selection of whether to request forwarding of the modified/converted message or forwarding the original message, and transmits the selection to the controller 230.

The display 250 displays various information and various menus, all of which are provided from the mobile terminal 200 and may be a Liquid Crystal Display (LCD) or an Organic Light Emitting Diode (OLED). Further, the display 250 may comprise two or more displays comprising a display on an external surface and a display on an internal surface.

The display 250 may display a multimedia message under the control of the controller 230. When a message requested to be forwarded by a user includes the modified/converted media file, the display 250 displays in a popup window that a message requested to forward is different from the original message.

The audio processor 270 performs a function of playing an audio signal that is decoded by the data processor 220 through a speaker (SPK) or transmitting an audio signal generated from a microphone (MIC) to the data processor 220.

Figure 3:
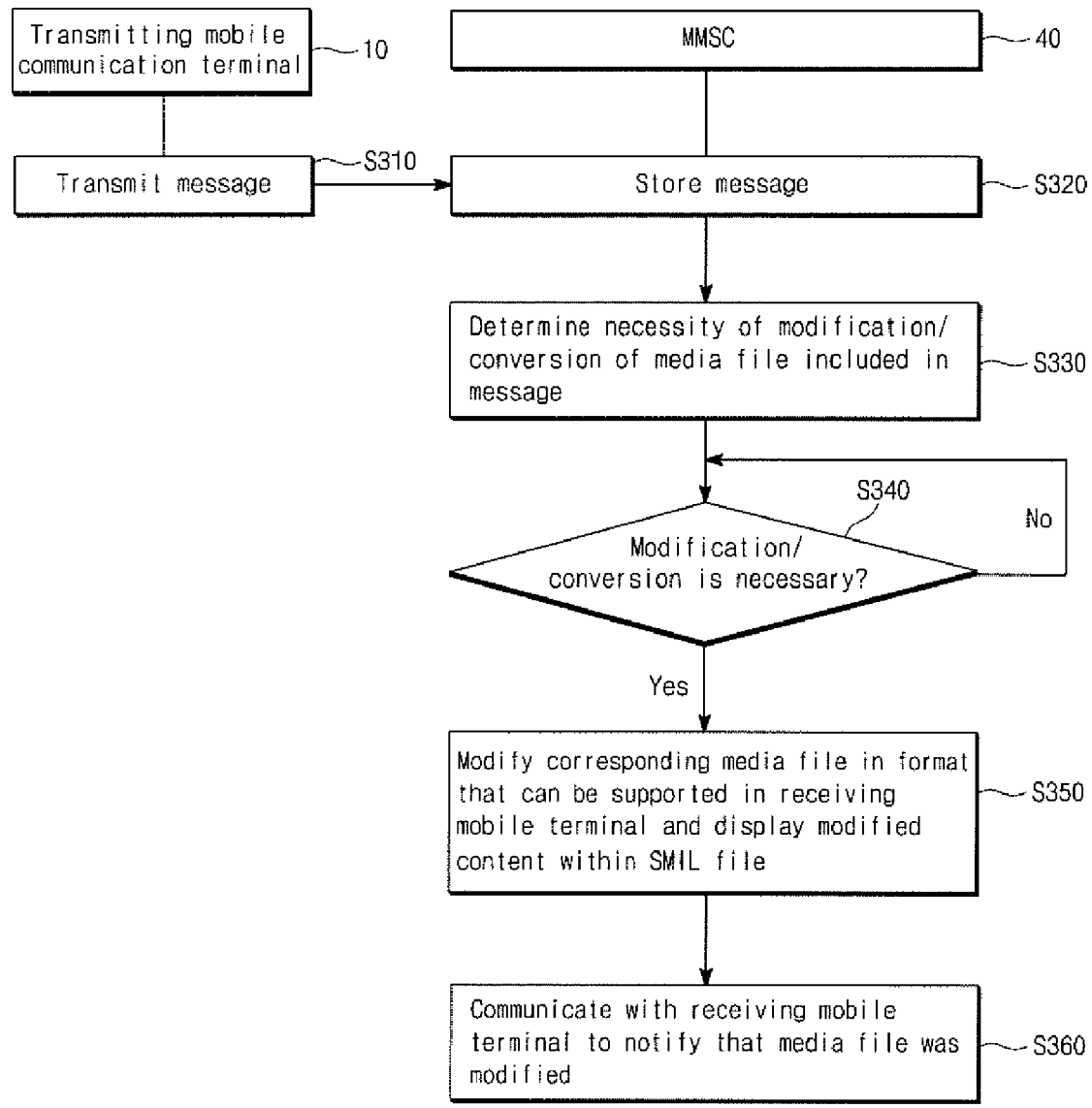
FIG. 3 is a flowchart illustrating a process for performing modification/conversion of a media file in a Multimedia Message Service Center (MMSC).

FIG. 3 is a flowchart illustrating a process of performing modification/conversion of a media file in a Multimedia Message Service Center (MMSC).

Referring to FIG. 3, if an original multimedia message is transmitted from the transmitting mobile terminal 10 to the MMSC 40 (S310), the MMSC 40 stores the received original multimedia message (S320).

The MMSC 40 determines whether it is necessary to convert a media file composed in the original multimedia message by checking information of a media file included in the original multimedia message and an UA profile information of the receiving mobile terminal 200 (S330).

In more detail, the MMSC 40 checks the type and size of a media file included in the received original multimedia message and a media format that can be supported in the receiving mobile terminal 200.

For example, when an image file is included in the media file, and the receiving mobile terminal 200 does not support resolution of an image file to transmit through checking the UA profile information of the receiving mobile terminal 200, the MMSC 40 determines if it is necessary to convert the media file.

If it is necessary to convert the media file (S340:Y), the MMSC 40 modifies the corresponding media file in a format that is supported in the receiving mobile terminal 200 and displays the modified content within a synchronized markup integration language (SMIL) file (S350).

In more detail, when the media file is modified, the MMSC 40 adds a 'status' field value within the SMIL file. The MMSC 40 converts src (source) within the SMIL file to the modified file name.

An example of a SMIL file in which the modified content is displayed is as follows:

```
<smil> <head> <layout>
    <root-layout width = "176" height = "174"/>
    <region id = "media" width = "176" height = "144"
    left = "0" top = "0"/>
    < region id = "text" width = "176" height = "30"
    left = "0" top = "144"/>
</layout> </head>
<body>
    <par dur = "5s">
        <img src = "LGE.jpg" region = "media" status = "modified"/>
        <text src = "slide1.txt" region = "text"/>
    </par>
</body> </smil>
```

As can be seen in the above SMIL file, if the modified content is generated in a specific media file included in the original multimedia message, the MMSC 40 converts 'src' within the SMIL file to the modified file name (ex: LGE.jpg) and adds a 'status' field to represent the modified contents. In the 'status' field, a field value, such as 'original', 'modified', or 'scalable' can be set.

The MMSC 40 performs communication with the receiving mobile terminal 200 to verify that the media file was modified to the receiving mobile terminal 200 (S360).

The MMSC 40 may send notification to the transmitting mobile terminal 10 that a media file included in the original multimedia message was modified. Communication between the MMSC 40 and the receiving mobile terminal 200 is performed by an immediate retrieval or a deferred retrieval function, and communication is determined by setting the receiving mobile terminal 200.

Figure 4:
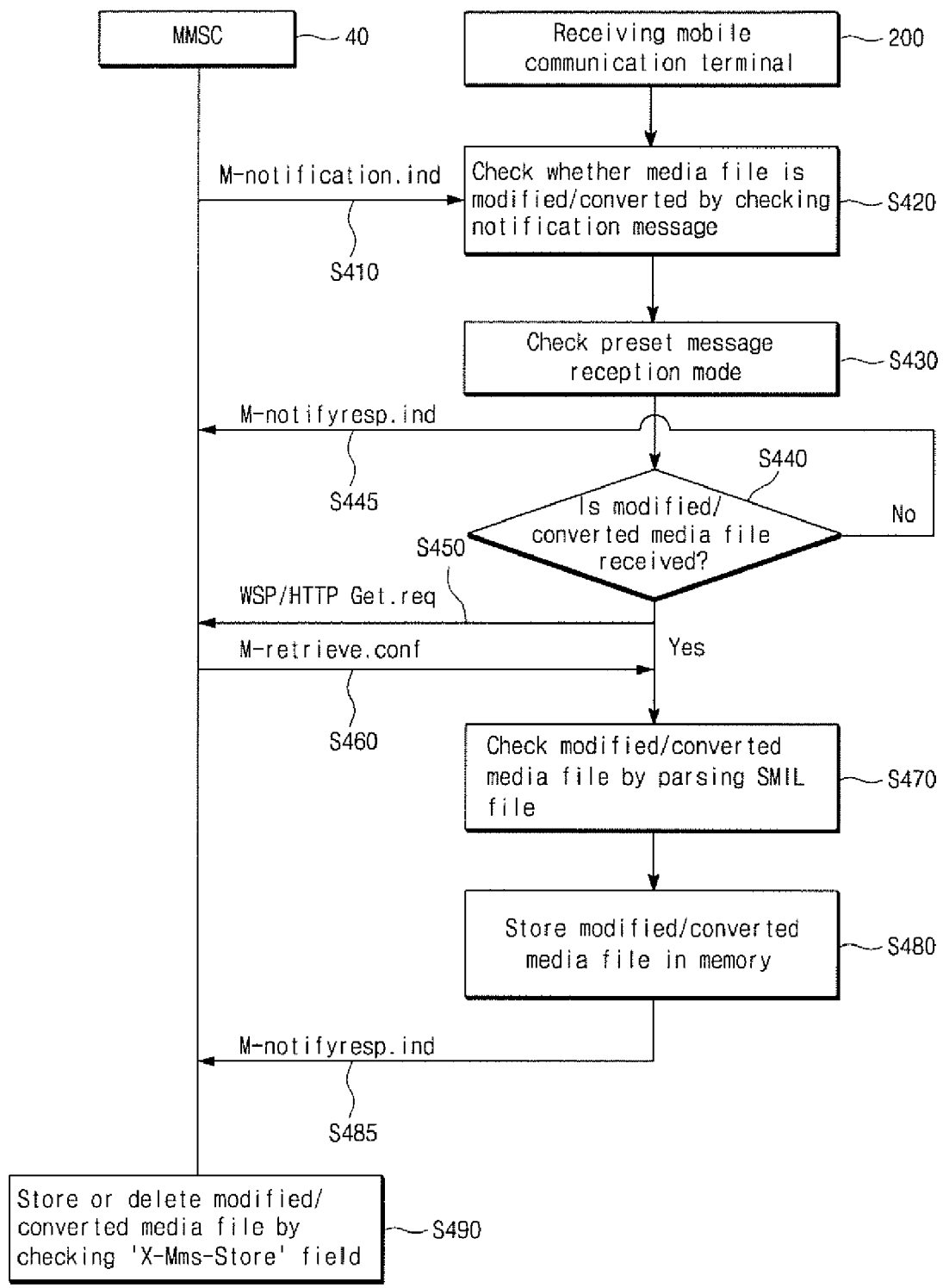
FIG. 4 is a message flow diagram illustrating a process for performing communication between a MMSC, according to an immediate retrieval procedure, and a receiving mobile terminal.

FIG. 4 is a message flow diagram illustrating a process of performing communication between a MMSC according to an immediate retrieval procedure and a receiving mobile terminal. Referring to FIG. 4, the MMSC 40 transmits an 'M-notification.ind' message, which is a notification message for notifying the that a multimedia message has arrived in the MMSC 40 (S410).

The MMSC 40 adds a new 'X-Mms-Content-Status' field for representing information regarding modification or conversion of a media file in the 'M-notification.ind' message and transmits the message to the receiving mobile terminal 200. Field values that are set to the 'X-Mms-Content-Status' field are 'Original', 'Modified', or 'Scalable', etc.

The 'Original' field value represents that a media file included in the message is not modified or converted. The 'Modified' field value represents that the media file included in the message is modified or converted. The 'Scalable' field value represents that the message is transmitted by adjusting quality of the media file according to a channel state upon streaming transmission.

The receiving mobile terminal 200 checks whether a media file included in an original multimedia message transmitted from the transmitting mobile terminal 10 is modified or converted by checking an 'X-Mms-Content-Status' field of the 'M-notification.ind' message (S420).

Furthermore, the receiving mobile terminal 200 checks the preset message reception mode (S430). Accordingly, when the message reception mode is set to receive a message comprising the modified/converted media file (S440), the receiving mobile terminal 200 transmits a 'WSP/HTTP GET.req' message to the MMSC 40 to request to transmit a multimedia message (S450).

As a response to the request, the MMSC 40 transmits an 'M-retrieve.conf' message including a media file and a SMIL file including information about a play function of the media file to the receiving mobile terminal 200 (S460). As described above, the modified or converted content of the media file is included in the SMIL file.

The receiving mobile terminal 200 plays or displays a media file included in an 'M-retrieve.conf' message received from the MMSC 40 according to a mode recorded in the SMIL file.

The receiving mobile terminal 200 checks a 'status' field by parsing the SMIL file included in the 'M-retrieve.conf' message received from the MMSC 40, and then checks the modified or converted media file among media files included in a multimedia message (S470).

If the modified or converted media file is checked, the receiving mobile terminal 200 stores the corresponding media file within a specific folder of the memory 240 (S480). The receiving mobile terminal 200 transmits a 'M-notiresp.ind' message to the MMSC 40 in response to the 'M-retrieve.conf' message (S485). In an embodiment of the present invention, a 'X-Mms-Store' field and a 'X-Mms-Store-Period' field are added to the 'M-notifyresp.ind' message.

Field values that can be set to the 'X-Mms-Store' field are 'Yes' and 'No'. 'Yes' is a field value for requesting that the MMSC 40 stores the corresponding message, i.e., a message in which the media file is modified or converted. The 'No' field value is for requesting that the MMSC 40 delete the corresponding message in which the media file is modified or converted.

The 'X-Mms-Store-Period' field displays a storage period for the corresponding message in the MMSC 40. Field values that can be set in the 'X-Mms-Store-Period' field are 'one hour', 'two hour', 'a week', 'a month', 'Max', or 'default'.

'One hour', 'two hour', 'a week', or 'a month' are field values for requesting storage of the corresponding message, in which the attached file is converted or modified, for a time period of one hour, two hours, a week, or one month in the MMSC 40.

If there is no separate request from the receiving mobile terminal 200, the 'Max' field value requests that the MMSC 40 continuously store the corresponding message, and a 'default' field value requests storage during a basic storage period that is set by the MMSC 40. The field value settings presented are not intended to be limiting, and it should be recognized that the 'X-Mms-Store-Period' field can be embodied with various values and settings.

The MMSC 40 receives an 'M-notifyresp.ind' message from the receiving mobile terminal 200, checks an 'X-Mms-Store' field and then stores or deletes a message including the modified or converted media file (S490). At this time, a storage period is determined according to a field value that is set to the 'X-Mms-Store-Period' field.

The MMSC 40 may send notification that the receiving mobile terminal 200 downloaded a message including a modified/converted media file by transmitting a specific message to the transmitting mobile terminal 10.

The specific message, in which the MMSC 40 transmits to the transmitting mobile terminal 10, may be a message prescribed in a MMS specification or a separate message. When the specific message is the message prescribed in the MMS specification, it can be displayed that the receiving mobile terminal 200 downloaded a message comprising the modified/converted media file within a specific field of the corresponding message. Alternatively, it can be displayed that a new field is added and the receiving mobile terminal 200 downloaded a message comprising the modified/converted media file within the added field.

As the result of checking the preset message reception mode (S430), if the message reception mode is set to reject reception of a message comprising the modified/converted media file (S440:N), the receiving mobile terminal 200 does not request a download of the message but directly transmits an 'M-notifyresp.ind' message to the MMSC 40 (S445).

Accordingly, the 'reject' field value represents rejection of the message in an added field of the 'M-notifyresp.ind' message. Therefore, the MMSC 40 can be informed that a multimedia message including the modified/converted media file in the receiving mobile terminal 200 was rejected.

By transmitting a specific message to the transmitting mobile terminal 10, the MMSC 40 sends a notification that the receiving mobile terminal 200 has failed to receive the modified/converted media file from the transmitting mobile terminal 10.

Herein, a specific message in which the MMSC 40 transmits to the transmitting mobile terminal 10 may be a message prescribed in a MMS specification or a separate message. When the specific message is the message prescribed in the MMS specification, MMSC 40 may add the information that the receiving mobile terminal 200 rejected to receive the modified/converted media file into a specific field of the specific message.

Alternatively, MMSC 40 may add a new field into the specific message and record information that the receiving mobile terminal 200 rejected to receive the modified/converted media file within the newly added field.

Figure 5:
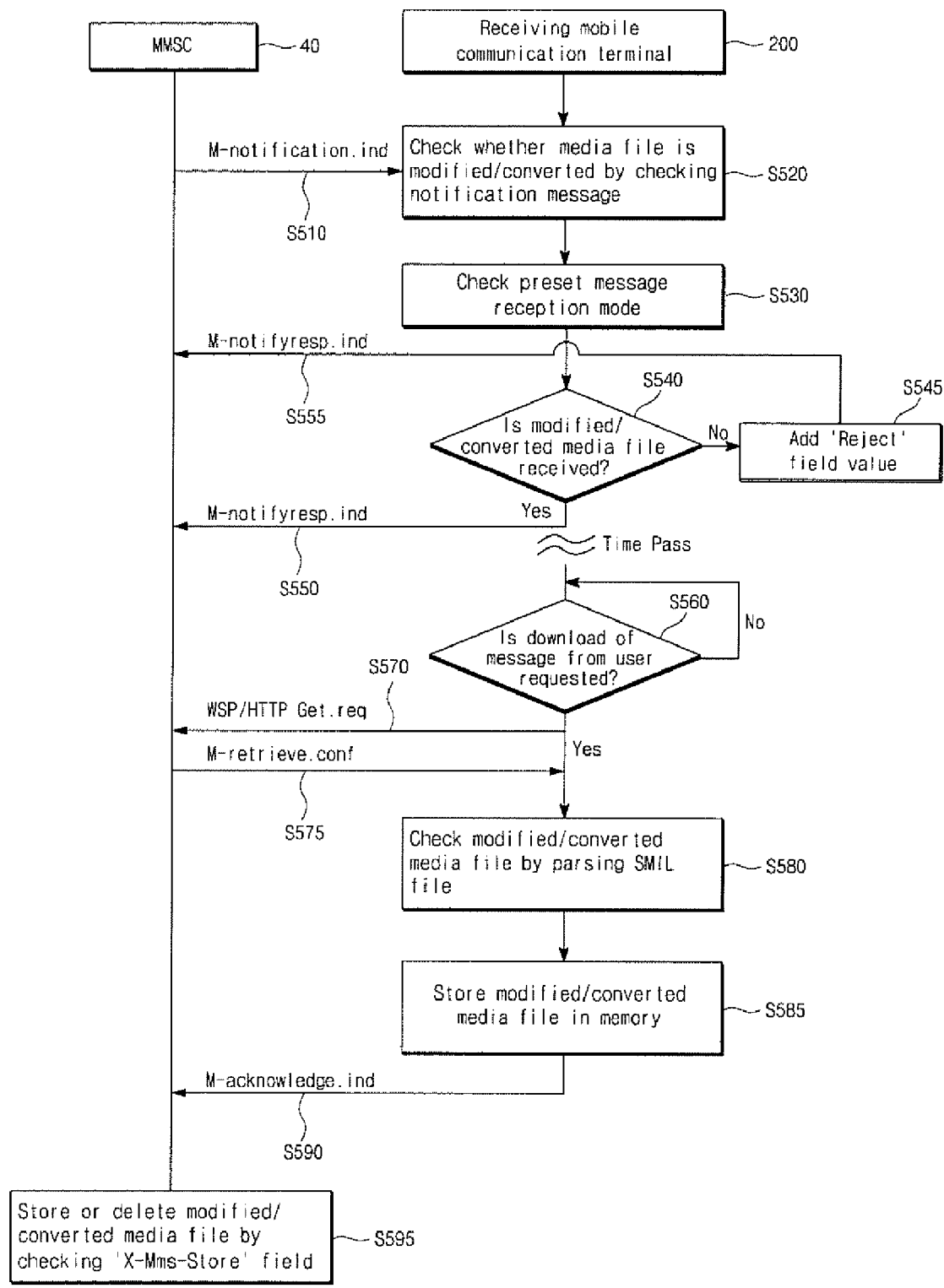
FIG. 5 is a message flow diagram illustrating a process for performing communication between a MMSC according to a deferred retrieval procedure and a receiving mobile terminal.

FIG. 5 is a message flow diagram illustrating a process of performing communication between a MMSC according to a deferred retrieval mode and a receiving mobile terminal.

Referring to FIG. 5, the MMSC 40 transmits an 'M-notification.ind' message, which is a notification message notifying that the multimedia message has arrived in the receiving mobile terminal 200 (S510). Accordingly, the user of the receiving mobile terminal 200 can be informed that a new multimedia message has arrived.

The MMSC 40 newly adds an 'X-Mms-Content-Status' field for displaying information of modification or conversion of a media file in the 'M-notification.ind' message and transmits the message to the receiving mobile terminal 200, as shown in FIG. 4. The field values that are set to the 'X-Mms-Content-Status' field are 'Original', 'Modified', or 'Scalable'.

The receiving mobile terminal 200 checks the 'X-Mms-Content-Status' field of the 'M-notification.ind' message and thus checks whether a media file included in an original multimedia message transmitted from the transmitting mobile terminal 10 is modified or converted (S520). Additionally, the receiving mobile terminal 200 checks the preset message reception mode (S530).

When the preset message reception mode is set to reject the received message including the modified/converted media file (S540:N), the receiving mobile terminal 200 adds a 'reject' field value for representing rejection of the message within a specific field of the 'M-notifyresp.ind' message (S545) and transmits the generated 'M-nofifyresp.ind' message to the MMSC 40 (S555).

Accordingly, the MMSC 40 can be informed that the receiving mobile terminal 200 rejected reception of a multimedia message including the modified/converted media file. When the receiving mobile terminal 200 rejects the received message, communication between the MMSC 40 and the receiving mobile terminal 200 is ended.

With reference to FIG. 5, as the MMSC 40 transmits a specific message to the transmitting mobile terminal 10, the MMSC 40 can send a notification to the transmitting mobile terminal 10 that the receiving mobile terminal 200 rejected receipt of the modified/converted media file.

Alternatively, if the preset message reception mode is set to receive a message comprising the modified/converted media file (S540:Y), the receiving mobile terminal 200 transmits the 'M-notifyresp.ind' message, which is a response message of the 'M-notification.ind' message to the MMSC 40 (S550).

If the user of the receiving mobile terminal 200 requests to download a message comprising the modified/converted media file through the input device 260 (S560:Y), the receiving mobile terminal 200 transmits a 'WSP/HTTP GET.req' message to the MMSC 40 to request transmission of the multimedia message (S570).

For example, in a deferred retrieval mode, unlike an immediate retrieval mode as described above, only when the user requests to download a multimedia message through the input device 260, the receiving mobile terminal 200 transmits the 'WSP/HTTP GET.req' message to the MMSC 40.

As a response thereof, the MMSC 40 transmits the 'M-retrieve.conf' message including a media file and a SMIL file including information regarding a play mode of the media file to the receiving mobile terminal 200 (S575). The modified or converted content of the media file is contained in the SMIL file.

According to an embodiment of the present invention, as the receiving mobile terminal 200 checks a 'status' field by parsing a SMIL file included in the 'M-retrieve.conf' message received from the MMSC 40, the modified or converted media file among media files included in the multimedia message is also checked (S580).

If the modified or converted media file is checked, the receiving mobile terminal 200 stores the corresponding media file within a specific folder of the memory 240 (S585).

The receiving mobile terminal 200 transmits an 'M-acknowledge.ind' message in response to the received 'M-retrieve.conf' message to the MMSC 40 (S590). In an implementation, an 'X-Mms-Store' field and an 'X-Mms-Store-Period' field are newly added to the 'M-acknowledge.ind' message. The 'X-Mms-Store' field, the 'X-Mms-Store-Period' field, and each field value thereof are equal to those described above and the descriptions will be omitted.

The MMSC 40 that receives the 'M-acknowledge.ind' message from the receiving mobile terminal 200, checks the 'X-Mms-Store' field and stores or deletes a message comprising the modified or converted media file (S595). The storage period is determined according to a field value that is set to the 'X-Mms-Store-Period' field.

As previously described, as the MMSC 40 transmits a specific message to the transmitting mobile terminal 10, the MMSC 40 can notify the transmitting mobile terminal 10 that the receiving mobile terminal 200 downloaded a message comprising the modified/converted media file.

Accordingly, the receiving mobile terminal 200 can check a modified or converted content of a media file included in the multimedia message.

In another embodiment of the present invention, a user of a receiving mobile terminal 200 may request to forward the received multimedia message, as described below.

Figure 6:
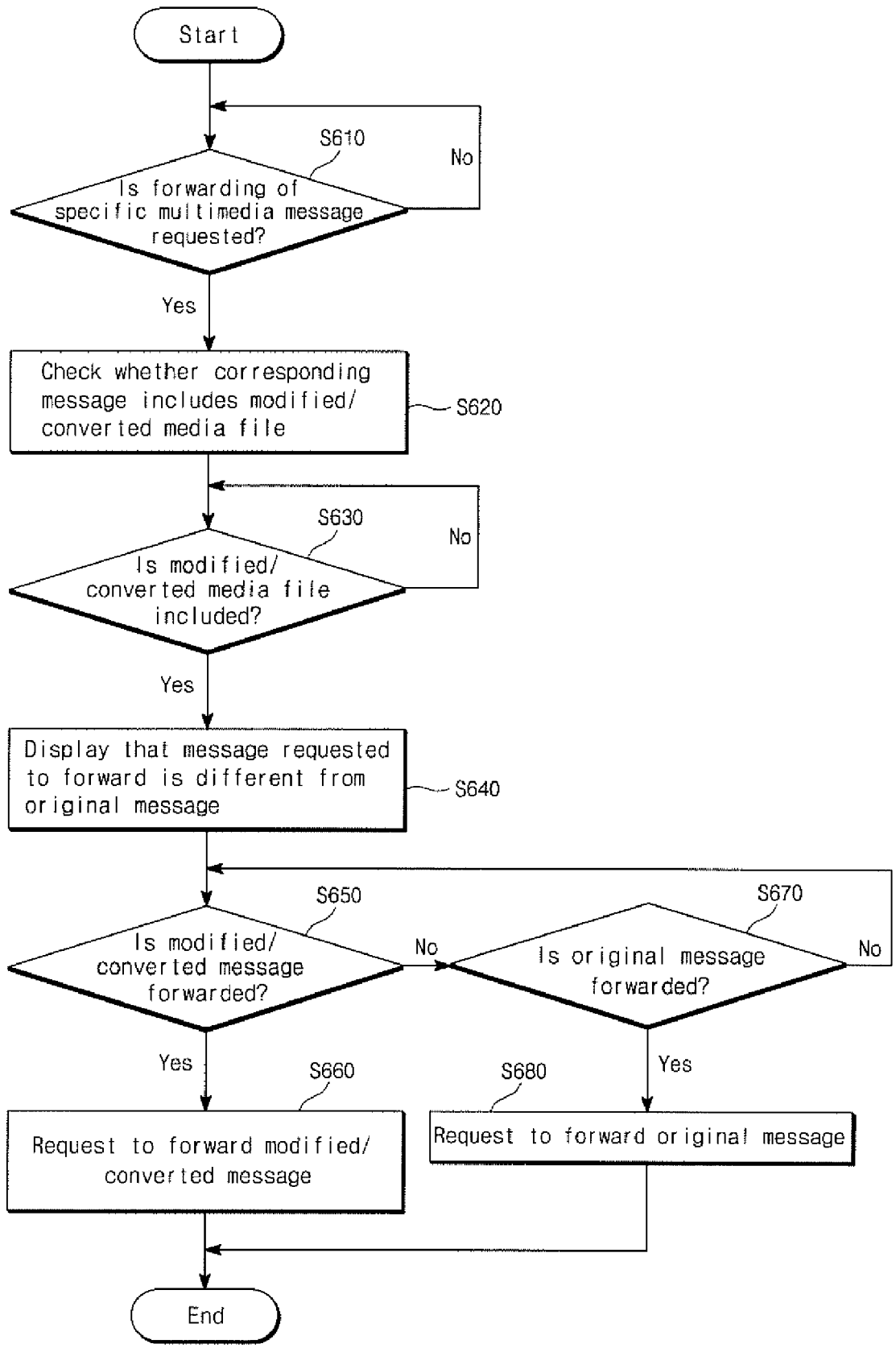
FIG. 6 is a flowchart illustrating an operation process when forwarding a multimedia message received by a user of a receiving mobile terminal is requested.

FIG. 6 is a flowchart illustrating an operation process when forwarding of a multimedia message received by the user of a receiving mobile terminal is requested.

Referring to FIG. 6, when forwarding of a specific multimedia message among multimedia messages received from the user is requested (S610:Y), the controller 230 of the mobile terminal 200 checks whether the corresponding message includes the modified or converted media file by checking a SMIL file of the corresponding message (S620).

In more detail, the controller 230 checks a field value within a 'status' field by parsing the SMIL file. If a media file in which a field value of the 'status' field is set to 'modified' exists, the corresponding media file is the modified or converted media file. When the corresponding message is a message including the modified or converted media file (S630:Y), the controller 230 controls the display 250 to indicate with a pop-up window that the message in which the user intends to forward is different from an original message (S640).

Figure 7:
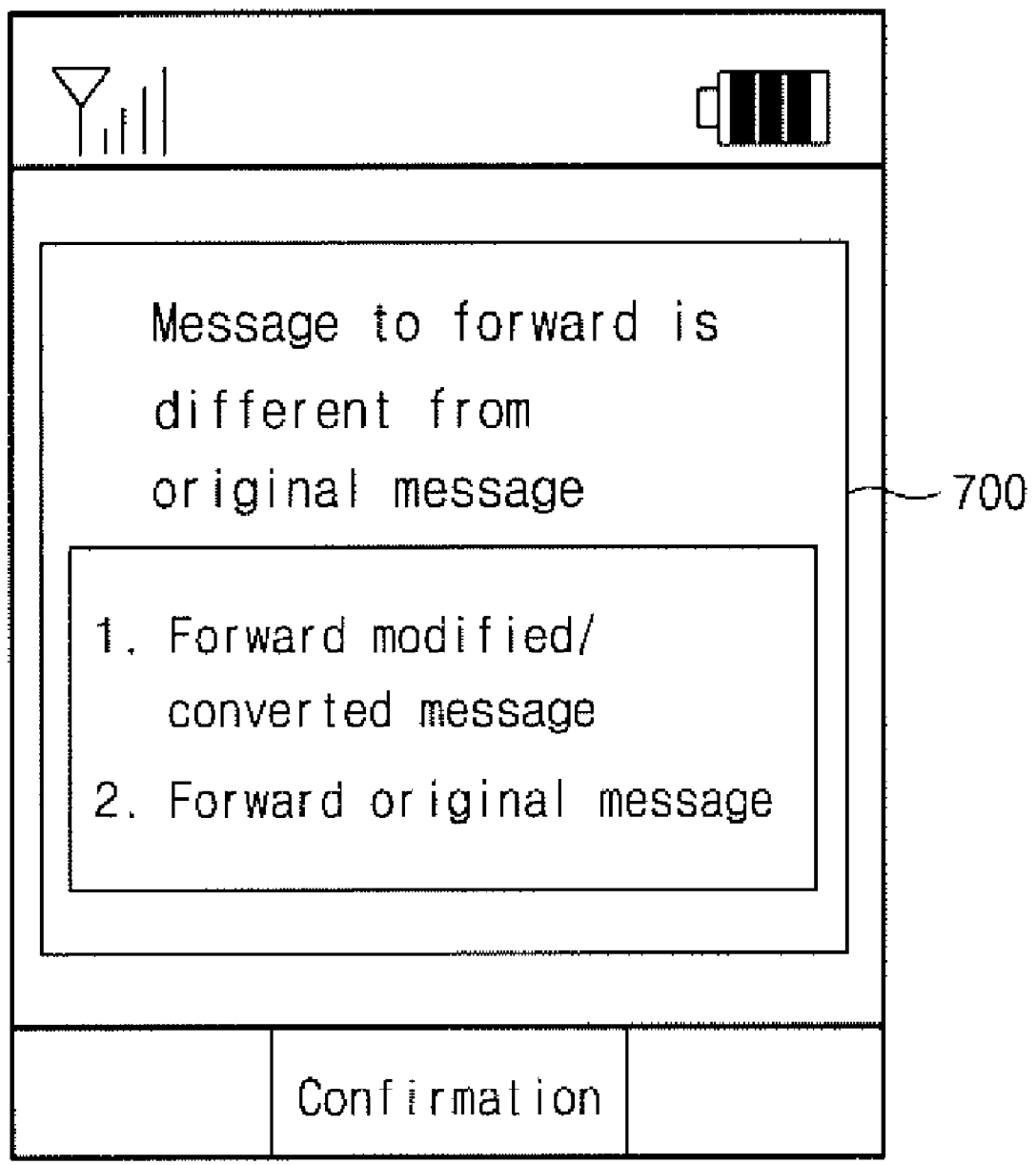
FIG. 7 illustrates a pop-up window displayed when a message to be forwarded by a user is different from an original message.

FIG. 7 illustrates a pop-up window displayed in a display when a message to be forwarded by a user is different from an original message.

Referring to FIG. 7, a guide phrase of "Message to forward is different from original message" is displayed in the pop-up window 700. In addition, a menu for selection by a user whether to forward the corresponding message in either a modified or converted state, or to forward the original message before being modified or converted is displayed in a lower end of the pop-up window.

For example, if the user selects through the input device 260 "1. Forwarding modified/converted message," which is the first menu item (S650:Y), then the receiving mobile terminal 200 requests to forward the modified/converted message to the MMSC 40 (S660).

In more detail, the receiving mobile terminal 200 generates an 'M-forward.req' message to request forwarding of the message and transmits the 'M-forward.req' message to the MMSC 40. According to another embodiment of the present invention, an 'X-Mms-Content-Usage' field is added to the 'M-forward.req' message. In this case, because forwarding of the modified/converted message is requested, the receiving mobile terminal 200 sets 'Modified' as a field value to the 'X-Mms-Content-Usage' field and then transmits the 'M-forward.req' message to the MMSC 40.

Alternatively, if the user requests "Forward original message," which is the second menu item through the input device 260 (S670), the receiving mobile terminal 200 requests to forward the original multimedia message to the MMSC 40 (S680).

In more detail, the receiving mobile terminal 200 generates the 'M-forward.req' message by setting 'Original' as a field value in the 'X-Mms-Content-Usage' field and transmits the generated 'M-forward.req' message to the MMSC 40.

Figure 8:
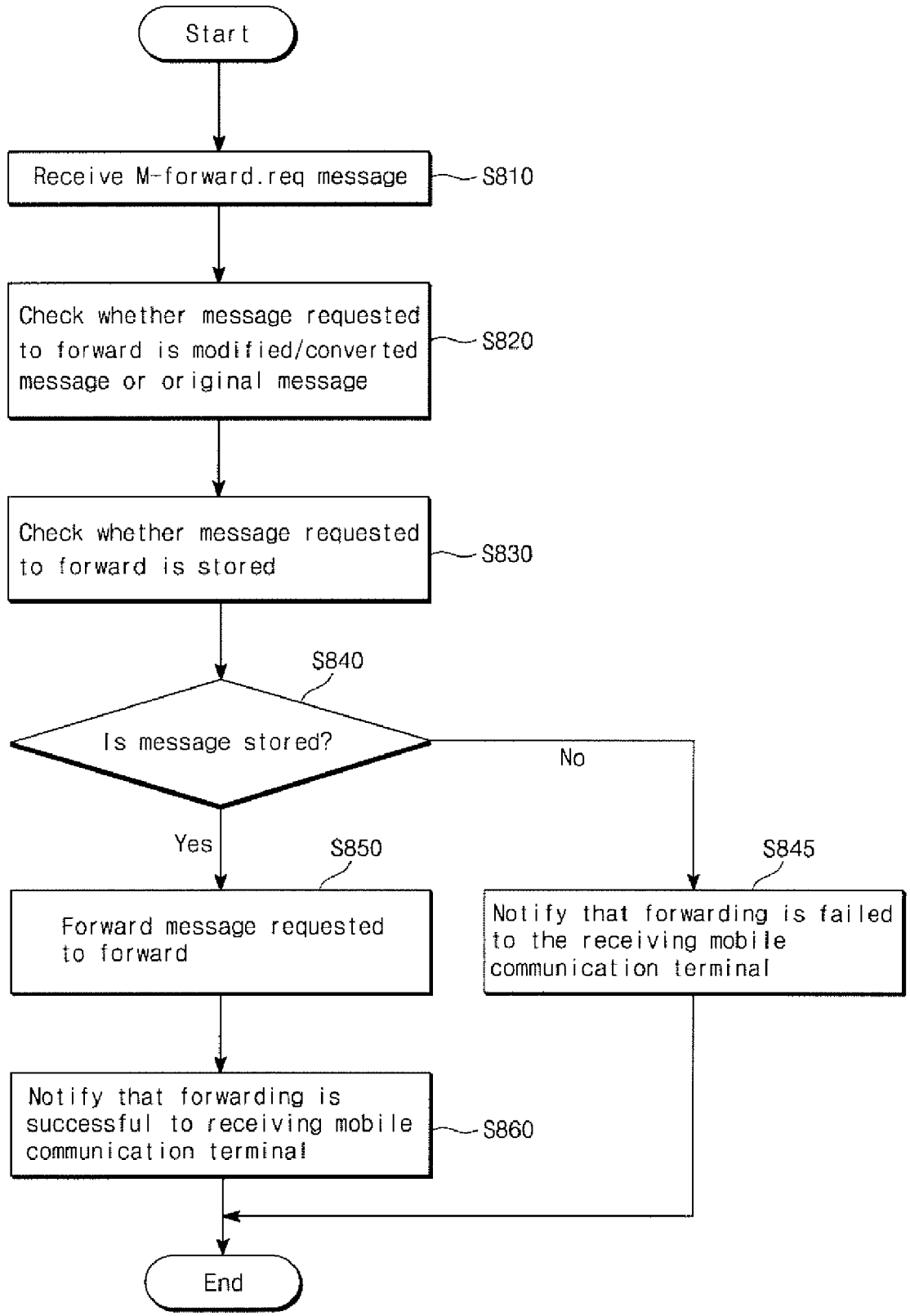
FIG. 8 is a flowchart illustrating an operation to be performed in a MMSC when forwarding a message from a receiving mobile terminal is requested.

FIG. 8 is a flowchart illustrating an operation to be performed in a MMSC when forwarding of a message from a receiving mobile terminal is requested.

Referring to FIG. 8, if the 'M-forward.req' message from the receiving mobile terminal 200 is received (S810), the MMSC 40 checks whether a message requested to be forwarded from the receiving mobile terminal 200 is a modified/converted message or an original message by checking the 'X-Mms-Content-Usage' field (S820).

The MMSC 40 determines whether a message requested to be forwarded is a message in which itself is stored (S830), and if the message is not stored (S840:N), the MMSC 40 sends a notice that forwarding failed to the receiving mobile terminal 200 (S845).

The MMSC 40 does not store the corresponding message because the MMSC 40 may delete a stored message when a predetermined period expires and delete the corresponding message due to an error of the MMSC 40.

Alternatively, if the message requested to be forwarded is stored (S840:Y), the MMSC 40 forwards the corresponding message (S850), and transmits the 'M-forward.conf' message for notifying the fact that forwarding is successful to the receiving mobile terminal 200 (S860).

When the message requested to be forwarded is a message comprising a modified or converted media file, the MMSC 40 displays that a specific media file is modified or converted within the SMIL file, and then forwards the corresponding message.

Also, the MMSC 40 can send notice information in which a request for forwarding from the receiving mobile terminal 200 is received, and whether a message requested to be forwarded is an original multimedia message or a message comprising a modified/converted media file to the transmitting mobile terminal 10.

In the above embodiment, the receiving mobile terminal 200 that receives the 'M-retrieve.conf' message from the MMSC 40 stores the corresponding media file in the memory 240 when the modified/converted media file is included by parsing the SMIL file.

However, the present invention is not limited thereto. That is, when the modified/converted media file is included, the corresponding media file may be displayed in the display 250 and then immediately deleted.

As described above, according to this embodiment, a user of the receiving mobile terminal 200 can determine whether a media file included in the received multimedia message is modified or converted. Furthermore, when the receiving mobile terminal 200 receives a multimedia message comprising the modified attached file and forwards the message to another user, forwarding of an original message, before being modified, may also be requested.

In the embodiment described above, where resolution of an image file or sound quality of an audio file is downgraded is described as an example of modification or conversion of a media file, but this invention is not limited thereto. That is, even where resolution of an image file or sound quality of an audio file is upgraded and the image file or the audio file is transmitted to the receiving mobile terminal 200, the media file may be regarded as being modified or converted.

As described above, a user of the receiving mobile terminal can check whether a media file included in the received multimedia message is modified or converted. When the received message is forwarded to another user, an original message before being modified or the modified/converted message can be selectively forwarded.

The foregoing embodiments and advantages are merely exemplary and are not to be construed as limiting the present invention. The present teaching can be readily applied to other types of apparatuses.

The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A mobile terminal, comprising:
   a transceiver for receiving a notification message comprising information indicating whether a media file in a transmitted message is modified;
   a controller configured to:
      set a message reception mode as to whether to receive or reject a message including a modified media file;
      selectively request downloading of the transmitted message after determining that the media file included in the transmitted message has been modified, based on the setting of the message reception mode of the mobile terminal; and
      cause the transceiver to download the transmitted message after determining that the message reception mode is set to receive the message including the modified media file;
   a display for displaying the modified media file; and
   an input device for requesting to forward a message in the mobile terminal,
   wherein the controller is further configured to:
      check whether the message to be forwarded includes the modified media file;
      cause the display to display information indicating that the message is different from an original message when the message includes the modified media file;
      cause the display to display a menu screen for selecting either the original message or the message comprising the modified media file; and
      cause the transceiver to forward the selected message when either the original message or the message comprising the modified media file is selected via the input device.

2. The mobile terminal of claim 1, further comprising:
   a memory for storing the message reception mode comprising information indicating whether the mobile terminal receives a message comprising a modified media file,
   wherein when the message reception mode is not set to receive the message comprising the modified media file, the controller does not requests request downloading of the message.

3. The mobile terminal of claim 2, wherein when the message is downloaded through the transceiver, the controller stores the modified media file in the memory.

4. The mobile terminal of claim 1, further comprising:
   an audio processor for executing the modified media file.

5. The mobile terminal of claim 1, wherein the notification message is an 'M-notification.ind' message, and the controller checks whether the message includes the modified media file by checking a specific field in the notification message.

6. The mobile terminal of claim 1, wherein the controller generates a response message requesting to delete or store the modified media file, and controls the transmission of the response message.

7. The mobile terminal of claim 6, wherein when the response message requesting to store the modified media file is transmitted, the controller sets information defining a storage period for the modified media file in the response message.

8. The mobile terminal of claim 1, wherein the controller checks whether the message includes the modified media file by parsing a synchronized markup integration language (SMIL) file included in the message.

* * * * *